United States Patent
Bowers

(10) Patent No.: US 10,414,485 B1
(45) Date of Patent: Sep. 17, 2019

(54) PROPELLER DESIGN

(71) Applicant: United States of America as Represented by the Administrator of NASA, Washington, DC (US)

(72) Inventor: Albion H Bowers, Lancaster, CA (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 315 days.

(21) Appl. No.: 15/239,293

(22) Filed: Aug. 17, 2016

Related U.S. Application Data

(60) Provisional application No. 62/210,022, filed on Aug. 26, 2015.

(51) Int. Cl.
| | |
|---|---|
| *F01D 5/14* | (2006.01) |
| *B64C 11/18* | (2006.01) |
| *B64C 27/467* | (2006.01) |
| *B64C 27/46* | (2006.01) |
| *F04D 29/38* | (2006.01) |

(52) U.S. Cl.
CPC .............. *B64C 11/18* (2013.01); *B64C 27/46* (2013.01); *B64C 27/467* (2013.01); *F01D 5/141* (2013.01); *F01D 5/147* (2013.01); *F04D 29/382* (2013.01); *F04D 29/384* (2013.01)

(58) Field of Classification Search
CPC ....... B64C 11/18; B64C 27/467; B64C 11/16; B64C 11/20; B64C 27/46; B64C 27/473; B64C 2027/7222; F01D 5/14–148; F04D 29/382; F04D 29/384; F04D 29/388
See application file for complete search history.

(56) References Cited

U.S. PATENT DOCUMENTS

| | | | | | |
|---|---|---|---|---|---|
| 4,012,168 | A | * | 3/1977 | Spellman | F04D 29/382 416/132 A |
| 4,364,708 | A | * | 12/1982 | David | F03D 1/0658 416/132 B |
| 4,729,714 | A | * | 3/1988 | Wrobel | F04D 19/002 415/119 |
| RE34,109 | E | * | 10/1992 | Gornstein | B64C 11/18 416/223 R |
| 5,505,589 | A | * | 4/1996 | Bergey | B64C 27/33 416/132 R |
| 6,465,902 | B1 | * | 10/2002 | Beauchamp | F01D 5/148 244/215 |
| 6,497,385 | B1 | * | 12/2002 | Wachspress | B64C 27/28 244/17.11 |
| 6,719,532 | B2 | * | 4/2004 | Bird | F04D 25/088 416/210 R |
| 6,719,533 | B2 | * | 4/2004 | Bird | F04D 25/088 416/210 R |

(Continued)

*Primary Examiner* — Carlos A Rivera
*Assistant Examiner* — Behnoush Haghighian

(57) ABSTRACT

The invention provides an improved propeller blade design by modifying a classic propeller blade design by changing the twist distribution across the propeller blade(s). This is accomplished by increasing the twist of each propeller blade on the inboard portion of the blade compared to a classic propeller design. At a break point, the twist provided across the propeller blade from the break point to the tip of the blade decreases so that the attack angle at the tip of the propeller blade is less than that of a classic propeller blade design.

4 Claims, 3 Drawing Sheets

(56) References Cited

U.S. PATENT DOCUMENTS

| | | | | |
|---|---|---|---|---|
| 6,733,241 B2 * | 5/2004 | Bird | ................ | F04D 25/088 416/238 |
| 6,779,978 B2 * | 8/2004 | Camargo Do Amarante | ............ | F04D 29/384 416/228 |
| 6,970,773 B2 * | 11/2005 | Phillips | ................ | B64C 3/10 701/7 |
| 7,131,819 B2 * | 11/2006 | Bird | ................ | F04D 25/088 416/238 |
| 7,210,910 B1 * | 5/2007 | Parker | ................ | F04D 25/088 416/223 R |
| 7,909,580 B2 * | 3/2011 | Simpson | ................ | F01D 5/141 416/223 A |
| 8,246,303 B2 * | 8/2012 | Thomas | ................ | B63G 8/18 416/23 |

* cited by examiner

PROPELLER DESIGN

CLAIM OF PRIORITY TO PRIOR PROVISIONAL APPLICATION

This application claims priority under 35 U.S.C. 119(e) from the provisional application filed on Aug. 26, 2015, Ser. No. 62/210,022.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to the design of propeller blades, fan blades, compressor blades, impeller blades, turbine blades, and the like. More particularly, the invention provides a new design for propeller type blades in mechanical systems and devices that employs minimizing power input to produce thrust or to maximize power output in the case of turbines as the design approach.

2. Description of the Related Art

Propeller theory, as currently practiced, was finalized in 1920 with the publication of NASA Report No. 116 authored by Ludwig Prandtl. Prandtl's student Albert Betz wrote the final third of Report 116 and devoted the entire section to propeller theory. Betz formulates the propeller problem and provides a theoretical basis for propellers through fluids. Later development to this fundamental framework is provided by another of Prandtl's students, Theodore Theordoresen.

The design approach taken by Prandtl, Betz, and Theodoreson assumes a constant lift coefficient across the propeller blade. This results in a uniform downwash everywhere. By carefully selecting the operating design point, a maximum lift to drag ratio can be achieved across the entire propeller blade, and this is characterized by being referred to as the "minimum induced loss" design. This approach should result in the minimum entropy being left in the wake of the propeller.

Blades designed using this approach result in a smoothly changing twist from the root to the tip. The physical limitation of materials drives designers to compromise the flow near the hub of the propeller, with blades that are thick and less efficient. Little thrust is developed over the inboard portion of the blade. It is the tips that are heavily loaded and produce most of the thrust. Due to the thrust and downwash abruptly disappearing at the tip, a large amount of the noise is created in the production of thrust.

A special case exists for turbines. Turbines are the opposite problem to a propeller. They are extracting energy from the flow, and there is an ultimate upper limit for the special case of open turbines (e.g. windmills). Betz calculated that the maximum efficiency of an open turbine was about 59%. For a given diameter turbine, only 59% of the energy of the flow could be extracted as energy. As more energy is being removed from the flow, the turbine becomes an obstruction and the fluid would prefer to flow around the turbine rather than flow through it and produce energy. This limit is imposed by the minimum induced loss assumption.

All propellers, fan blades, compressor blades, impeller blades, and in the negative case, turbines are designed this way today.

However, as noted above, the minimum induced loss design concept was a convenience for calculation ease in solving the problem of propellers and, therefore, inherently does not result in the most efficient design for systems and devices employing propeller blades. Therefore, it is desired to provide an improved design for propeller blades used in systems and devices that improves efficiency.

SUMMARY OF THE INVENTION

The invention provided herein sets forth an improved design for propeller blades for systems and devices that, rather than focusing on the minimum induced loss as discussed above, focuses on achieving the required thrust using a minimum input power.

The implication of using the minimum input power for a given thrust in the design of a propeller blade is that it is possible to change the thrust load across the blade and across the propeller disc. Changing the load distribution changes the torque and hence the power, while holding the thrust constant. Hence, the invention provided herein focuses on determining the minimum torque for a given thrust and holding all other variables in the design of a propeller blade constant. The selected inputs that are held constant include: propeller diameter, advance ratio, blade area, airfoil profile, output thrust, and propeller rpm. The independent variable would be twist distribution across the propeller blade and the dependent variable would be input power (because rpm is held constant, this is input torque).

By using the above general design guidelines, the invention proposed herein comprises an improved propeller design that modifies the twist profile across the propeller blade in order to maximize efficiency.

Accordingly, it is an object of this invention to provide an improved propeller blade system.

It is a further object of this invention to provide an improved propeller blade system that provides required thrust using minimum input power.

It is yet a further object of this invention to employ a changing twist distribution across a propeller blade to improve efficiency.

This invention meets these and other objectives related to an improved propeller blade system design by modifying a classic propeller blade design by changing the twist distribution across the propeller blade(s). This is accomplished by progressively increasing the degree of twist of each propeller blade on the inboard portion of the blade compared to a classic propeller design. At a break point, the twist provided across the propeller blade from the break point to the tip of the blade (the outboard portion of the blade) decreases so that the attack angle at the tip of the propeller blade is less than that of a classic propeller blade design.

This propeller blade design can be used in numerous systems that employ propeller blades in order to increase the efficiency of these systems.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

Figure 1:
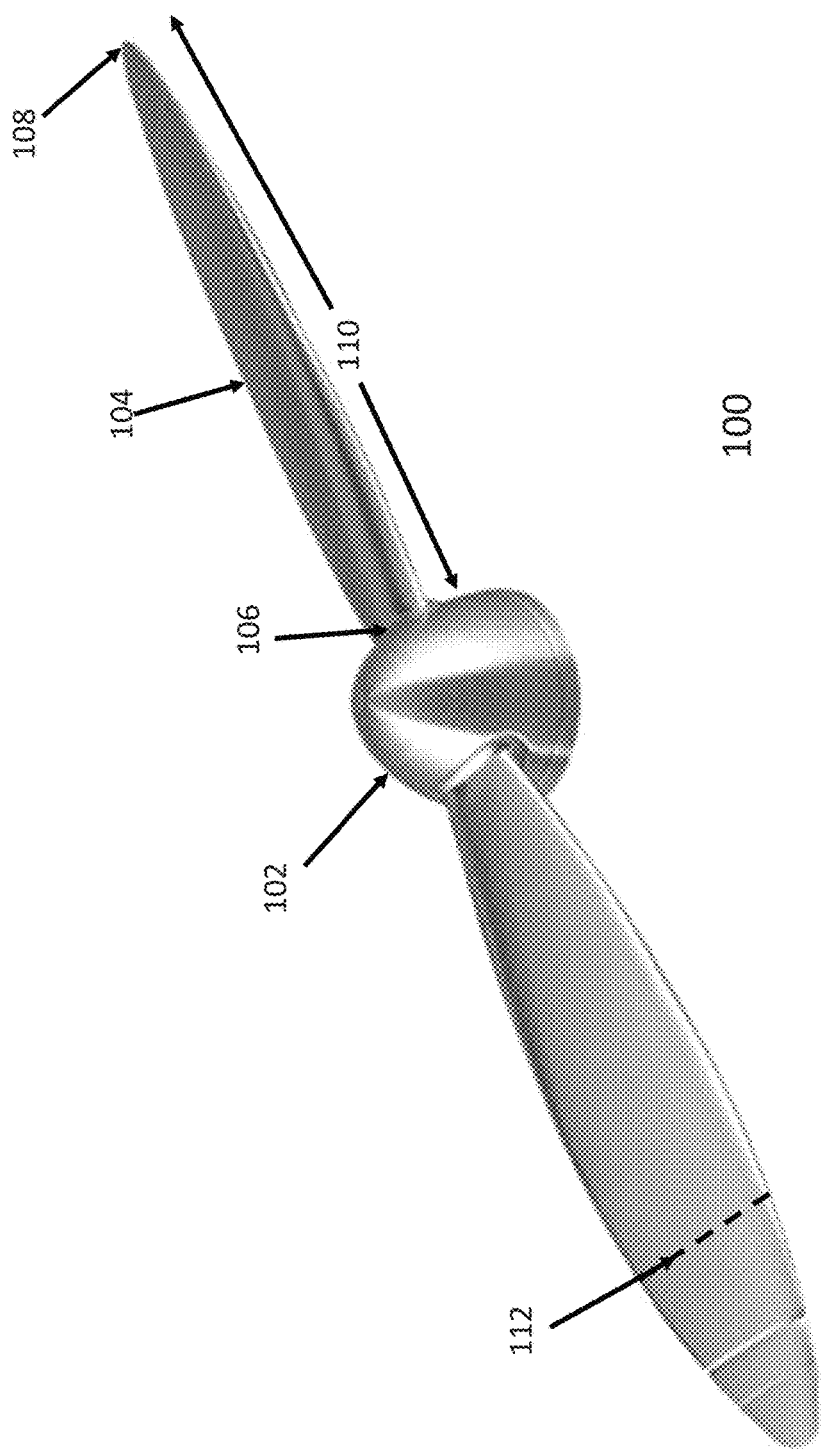
FIG. 1 depicts an embodiment of a propeller blade of the present invention.

Comparisons are provided herein of the present invention with "a classic propeller blade design." For reference, the classic propeller blade design, as used herein, constitutes a constant degree of twist across the blade. From a practical standpoint, this constant degree of twist does not actually begin directly at the root of the blade (which is defined herein as the portion of the blade that attaches to the rotatable hub of a propeller blade system), due to the necessity of manufacturing the blade and attaching it to the hub. As such, the actual degree of twist begins at some point up to the first twenty percent of the surface area of the blade (both in the classical propeller blade design and the present invention). So, when twist distribution across the propeller blade is discussed herein, the term is meant to mean from the point the twist begins (at some point from the root to about 20% from the root of the blade surface). In addition, it should be understood that when discussing the classic propeller design that the invention described herein modifies that design by progressively increasing the inboard degree of twist on such a propeller blade and decreasing the outboard degree of twist. While many current blades have a twist of approximately 42 degrees across the blade, this is dependent upon the actual use of the blade and when using the term classic propeller blade herein it is meant to be dependent upon the particular use and configuration of the propeller blade system. Thus, the present invention is meant to apply from the baseline of the constant twist across the blade for the particular purpose for which said blade is used.

One skilled in the art also recognizes that the twist distribution of a propeller blade directly correlates to the "angle of attack" of said blade. Hence, herein when discussing the angle of attack of the propeller blade, this is akin to discussing the twist of the propeller blade.

The present invention is based on the premise of optimizing the design of a propeller blade by redistribution of the load inboard to reduce power. However, the design must also determine how much of the load can be redistributed inboard while still maintaining thrust.

As such, in general, the present invention maximizes the lift of the blade inboard to the maximum. This is accomplished by progressively increasing the inboard degree of twist on the propeller blade at a constant rate that is greater than that of a classic propeller blade. This increased twist maximizes the lift on that portion of the blade (maximizing the angle of attack).

The constant, progressively increasing twist is maintained until a specific point, which will herein be referred to as the breaking point, wherein the amount of twist (or angle of attack) will decrease all the way to the tip of the propeller blade. At that point, the amount of twist will be less than that of a classic propeller blade (hence, the outboard twist or angle of attack will be significantly lower than that of the inboard portion of the propeller blade).

The load at the tip can reduce to any value from 70% of the maximum load to 0% of the maximum load. The thrust required dictates how much reduction is required for a particular design.

Blades designed using the present invention display a distinct "break" in their twist distribution. There is a second curve which the blades follow outboard of the breaking point. It is this second curve, at a steeper angle, that characterizes the new propeller design.

Referring to FIG. 1, the present invention is an improved propeller system 100 having a rotatable hub 102 and at least one propeller blade 104 connected to the rotatable hub at a blade root 106. The blade 104 has a blade tip 108 at the distal end and a blade length 110 from the blade root to the blade tip. The propeller blade 104 comprises a constant angle of attack, resulting from a constant twist distribution from the point a propeller blade normally begins to twist (usually from about 10% to about 20% of the blade length 110 from the blade root 106) to a break point 112. The break point 112 being located at a position from about 50% of the blade length 110 to about 90% of the blade length 110 from the blade root 106. More preferably, the break point 112 is located at a position from about 60% to about 85% of the blade length 110 from the blade root and, most preferably, the break point 112 is located at about 80% of the length of the blade 110.

The constant angle of attack or twist comprises from about one degree to about twelve degrees greater than the angle of attack of a classic propeller blade. More preferably, the constant angle of attack or twist of the present invention comprises from about 1.5 degrees to about 5 degrees greater than the angle of attack of a classic propeller blade.

However, after the break point 112 to the blade tip 108, the angle of attack or twist decreases. At the tip 108, the angle of attack or twist ranges from about 0.5 degrees to about ten degrees less than that of a classic propeller blade and, more preferably from about one degree to about 2 degrees less than that of a classic propeller blade.

As noted above, the invention herein comprises modifying the angle of attack/twist of the propeller blade versus that of a classic propeller blade design. Other variables remain constant. The materials, etc. that the blade is made from would be the same for the particular purpose of the blade. The general methodology of calculating the proper twist across the blade and the break point discussed above for particular embodiments of the invention (based on desired thrust) is described below.

The important criteria that drive the inboard angle change are two: the material used to create the propeller (e.g.: wood, or metal), and resulting airfoil. The material determines the strength properties of the particular blade. The material properties drive the airfoil selection strongly. Airfoil selection based solely on aerodynamic criteria would have large amount of camber (curvature) and this often results in sharp edged trailing edges. This is not allowable by the structure because of the bending created along the blade of the propeller. So, airfoil designers are forced to create thick rounded trailing edges or to place the trailing edges close to the center of the bending plane of the blade. This trade-off results in difficult choices between structure and aerodynamic performance.

Figure 3:
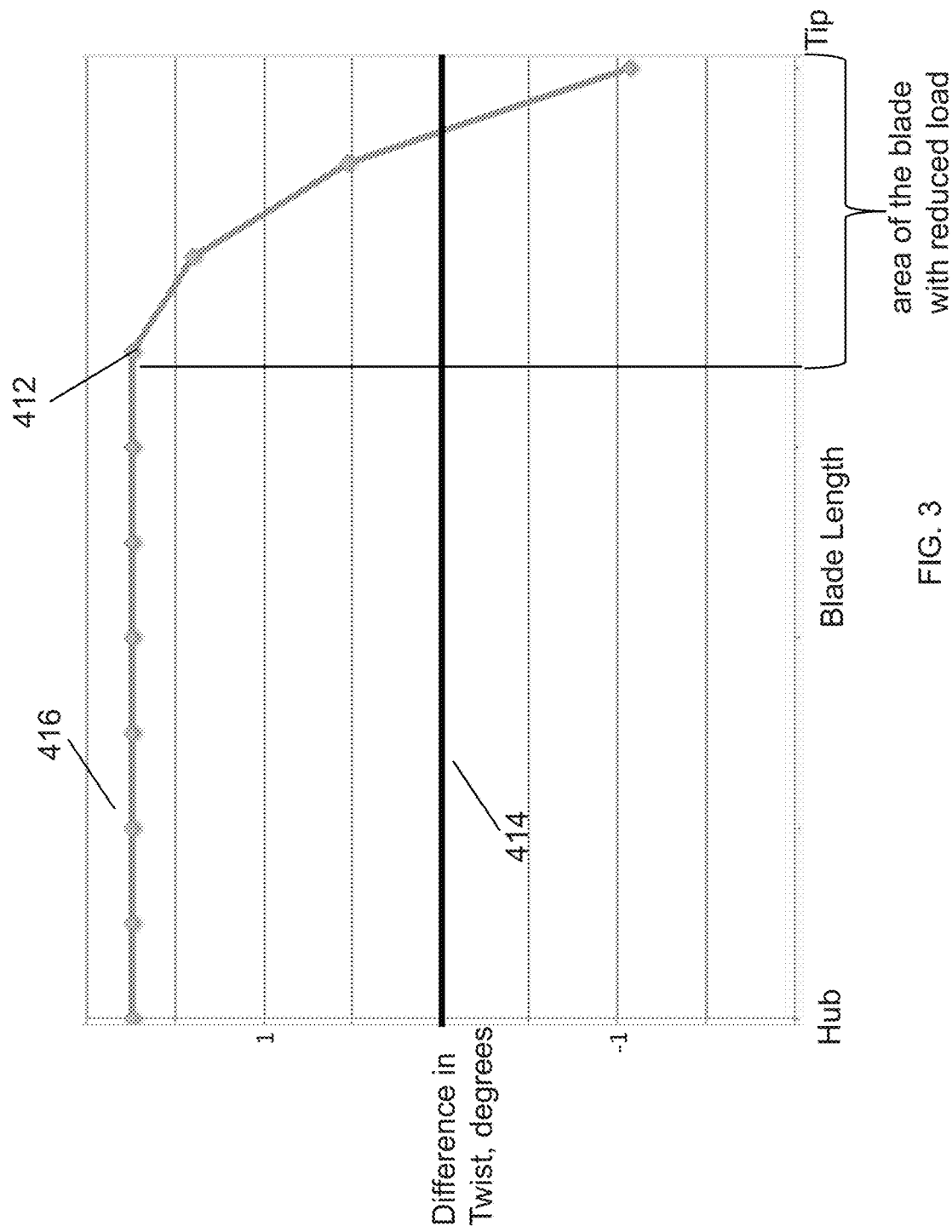
FIG. 3 is a graphical representation of another embodiment of the invention showing the twist distribution comparison with a classical propeller blade design wherein the decrease from the breaking point is not linear.

The second issue is the airfoil itself. Even with the limitations of the material, the airfoil selection still offers some latitude in propeller design. The design criteria on the inboard section of the blade is driven by the maximum lift coefficient. The inboard section of the blade (from the hub to the break point) is designed to achieve the maximum lift coefficient possible for the given material and disc loading. Outboard of the break point, the additional gain in thrust is offset by the increasing consumption of torque and power. So, it is an improvement in the thrust created by the power required ratio that dictates a reduced loading of the blade at the tip. If the disc loading is sufficiently high, it will distort the outer linear taper near the tip to become more nonlinear to increase the area under the curve (as depicted in FIG. 3, discussed further below).

As such, one skilled in the art will recognize that for a slow rotating propeller that is used to generate a small amount of power, the twist difference between the classical propeller and the present invention will be a relatively small amount and the break point location will be further from the propeller tip; however, for a fast moving propeller used to generate a large amount of power, the twist difference will be relatively large and the break point will be closer to the tip.

The following provide numerical examples to illustrate this general principal:

Example 1: for a slow turning propeller which has very light loading (for example, the case of a human powered aircraft, which is very slow, requires very low power, and is propelled by a very large propeller turning very slowly), the present invention could be embodied by a small change in angle inboard (perhaps only 2 degrees) versus a classic propeller, the tip would only have −0.5 degrees difference relative to the classical propeller, and the break point might be at 0.5 of the blade length (50% from the center of the propeller to the tip).

Example 2: for a fast propeller with a very high loading (for example, a STOL commuter plane with large, fast turning props), the inboard angle of attack would be much larger than a classic propeller design (perhaps 10 degrees more angle of attack) and the tip might be −2.5 degrees difference relative to the classical propeller, with a break point at 0.85 of the blade length.

Figure 2:
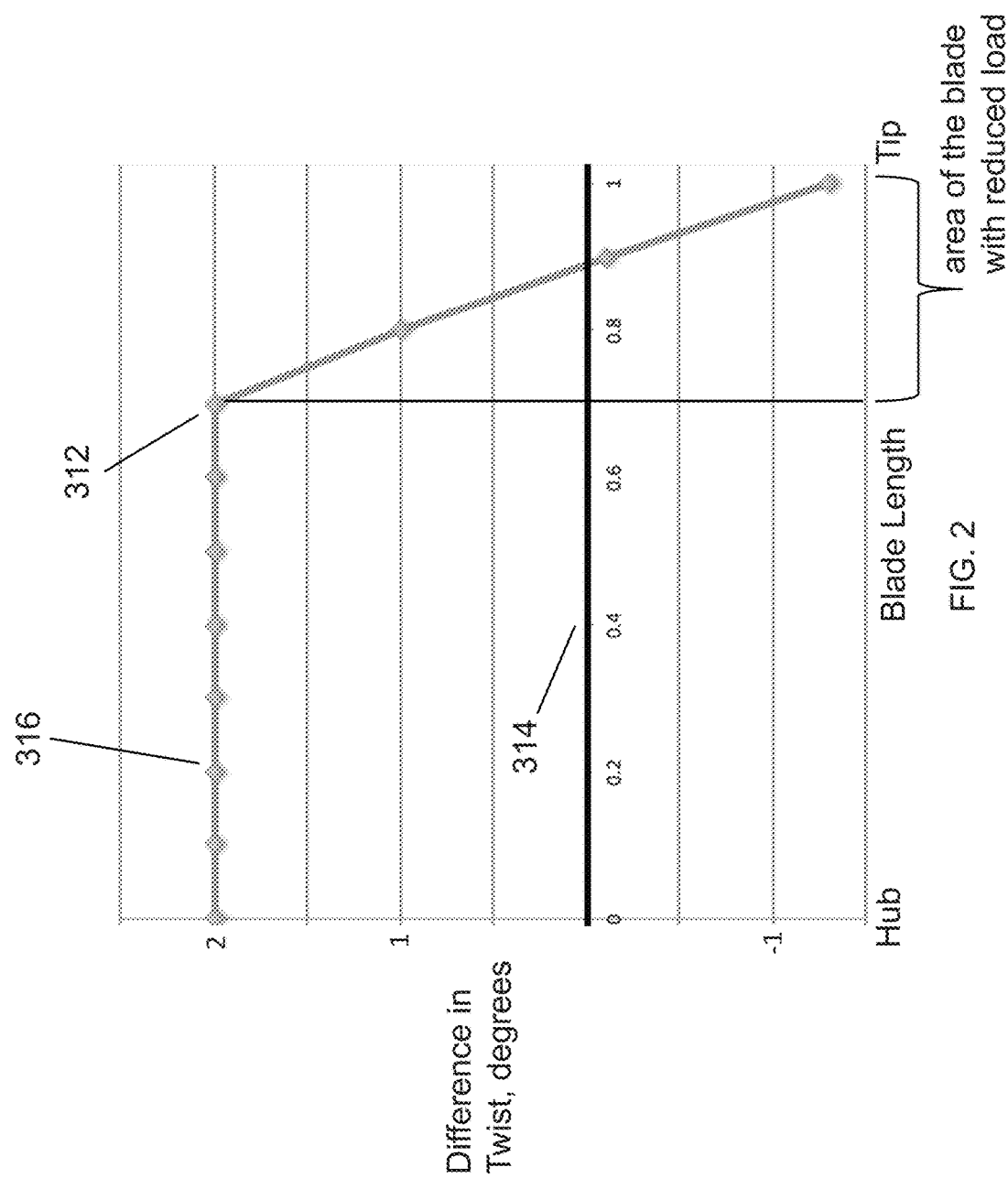
FIG. 2 is a graphical representation of the embodiment of the invention depicted in FIG. 1.

Referring to FIG. 2, this graph depicts the difference between the classical propeller 314 and the new propeller 316. As such, the classical propeller 314 is set to be the reference (the "zero" line) and the new propeller 316 is then displaying the difference in twist between them.

It more clearly shows that differential of the twist distribution between the present invention propeller blade 316 and a classic propeller blade 314 is constant (greater) until the break point 312, wherein the present invention propeller blade 316 decreases linearly to the tip (where the twist is less than that of the classic propeller blade 314 design).

Referring to FIG. 3, this graph shows the same information as FIG. 2 for a different embodiment of the present invention. In this embodiment, the decrease in twist after the break point 412 is non-linear. This results from a higher disc loading of the propeller 416. The high disc loading results in an increase in load at the tip necessary to achieve the required thrust, at a cost of increased torque and power required. Note that this graph also depicts the difference between the classical propeller 414 and the new propeller 416. As such, the classical propeller 414 is, again, set to be the reference (the "zero" line) and the new propeller 416 is then displaying the difference between them.

What is described are specific examples of many possible variations on the same invention and are not intended in a limiting sense. The claimed invention can be practiced using other variations not specifically described above.

What is claimed is:

1. An improved propeller system, comprising:
   a rotatable hub;
   at least one propeller blade connected to the rotatable hub at a blade root, having a blade tip at a distal end and a blade length from the blade root to the blade tip, wherein the blade comprises a constant increasing angle of attack from 20% of the blade length from the blade root to a break point, the break point comprising a position from 50% of the blade length to 90% of the blade length from the blade root; and, wherein from the break point to the blade tip the propeller blade comprises a decreasing angle of attack.

2. The improved propeller system of claim 1, wherein the break point comprises a position from 60% to 85% of the blade length from the blade root.

3. The improved propeller system of claim 1, wherein the break point comprises a position of 80% of the blade length from the blade root.

4. The improved propeller system of claim 1, wherein a plurality of propeller blades are connected to the rotatable hub.

* * * * *